(12) United States Patent
Ushida et al.

(10) Patent No.: US 7,715,665 B2
(45) Date of Patent: May 11, 2010

(54) PHOTONIC CRYSTAL OPTICAL CIRCUIT AND METHOD FOR CONTROLLING THE SAME

(75) Inventors: Jun Ushida, Tokyo (JP); Hirohito Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 99 days.

(21) Appl. No.: 12/032,392

(22) Filed: Feb. 15, 2008

(65) Prior Publication Data

US 2008/0316749 A1 Dec. 25, 2008

Related U.S. Application Data

(62) Division of application No. 10/543,649, filed as application No. PCT/JP03/016434 on Dec. 22, 2003, now Pat. No. 7,359,606.

(30) Foreign Application Priority Data

Jan. 29, 2003 (JP) .............................. 2003-019727

(51) Int. Cl.
G02B 6/12 (2006.01)
G02B 6/00 (2006.01)
G02B 6/26 (2006.01)
G02B 6/28 (2006.01)
G02B 6/30 (2006.01)
G02B 6/02 (2006.01)
G02B 6/10 (2006.01)
G02B 1/10 (2006.01)
G02F 1/00 (2006.01)
H01S 3/00 (2006.01)

(52) U.S. Cl. .............................. 385/14; 385/11; 385/12; 385/13; 385/15; 385/16; 385/24; 385/39; 385/48; 385/49; 385/125; 385/129; 385/140

(58) Field of Classification Search ............. 385/11–16, 385/24, 39, 48, 49, 125, 129, 140; 359/586, 359/322, 344
See application file for complete search history.

(56) References Cited

U.S. PATENT DOCUMENTS

2001/0012149 A1 8/2001 Lin et al.

(Continued)

FOREIGN PATENT DOCUMENTS

JP 11-330619 A 11/1999

(Continued)

OTHER PUBLICATIONS

T. Asano, "29p-L-7 Nijigen Photonic Kessho ni yoru Hacho Bungoha Device—Ten Kekkankan no Kansho", 2002 Nen (Heisei 14 Nen) Shunki Dai 49 Kai Oyo Butsurigaku Kankei Rengo Koenkai Koen Yokoshu, vol. 3, Mar. 27, 2002; p. 1039.

(Continued)

Primary Examiner—Brian M. Healy
Assistant Examiner—Hung Lam
(74) Attorney, Agent, or Firm—Sughrue Mion, PLLC

(57) ABSTRACT

In an optical circuit including multi-dimensional photonic crystals, in which the optical circuit has a structure (33), such as a light emitting member or a light receiving member, having a natural resonance frequency, another structure (34) having a natural resonance frequency slightly differing from the natural resonance frequency of the structure (33) is arranged in the vicinity of the structure (33) to control the directivity of localization and propagation of an electromagnetic field, light emission and light reception in a spatial region including the above structures in the multi-dimensional photonic crystals, in order to permit functional operations to be realized.

10 Claims, 9 Drawing Sheets

U.S. PATENT DOCUMENTS

| | | | |
|---|---|---|---|
| 2001/0054681 A1* | 12/2001 | Hamada | 250/227.11 |
| 2002/0097770 A1 | 7/2002 | Mekis et al. | |
| 2004/0027646 A1* | 2/2004 | Miller et al. | 359/322 |
| 2004/0081388 A1* | 4/2004 | Koyama | 385/16 |
| 2005/0226562 A1 | 10/2005 | Romagnoli et al. | |

FOREIGN PATENT DOCUMENTS

| | | |
|---|---|---|
| JP | 2001-91912 A | 4/2001 |
| JP | 2001-272555 A | 10/2001 |
| JP | 2002-62554 A | 2/2002 |
| JP | 2002-131715 A | 5/2002 |
| JP | 2002-333536 A | 11/2002 |

OTHER PUBLICATIONS

J.D. Joannapoulos et al., "Photonic Crystals", Princeton University Press, 1995.

A. Mekis et al., "Bound states in photonic crystal waveguides and waveguide bends", Physical Review B, vol. 58, No. 8, Aug. 15, 1998; pp. 4809-4817.

A. Mekis et al., "High transmission through sharp bends in Photonic Crystal Waveguides", Physical Review B, vol. 77, No. 18, Oct. 28, 1996; pp. 3787-3790.

S.Y. Lyn et al. "Experimental Demonstration of Guiding and Bending Electromagnetic Waves in a Photonic Crystal", *Science*, col. 282, Oct. 9, 1998; pp. 274-276.

S.Y. Lyn et al. "Low-loss, wide-angle Y splitter at ~ 1.6-μm wavelengths built with a two-dimensional photonic crystal", Optics Letters, vol. 27, No. 16, Aug. 15, 2002; pp. 1400-1402.

M. Tokushima et al. "Lightwave propagation through a 120° sharply bent single-line-defect photonic crystal waveguide", Applied Physics Letters, vol. 26, No. 8, Feb. 21, 2000; pp. 952-954.

H. Yamada et al. "Active and Passive Optical Components for WDM Communications II", submitted to The International Society for Optical Engineering, vol. 4870, 2002; pp. 357-367.

* cited by examiner

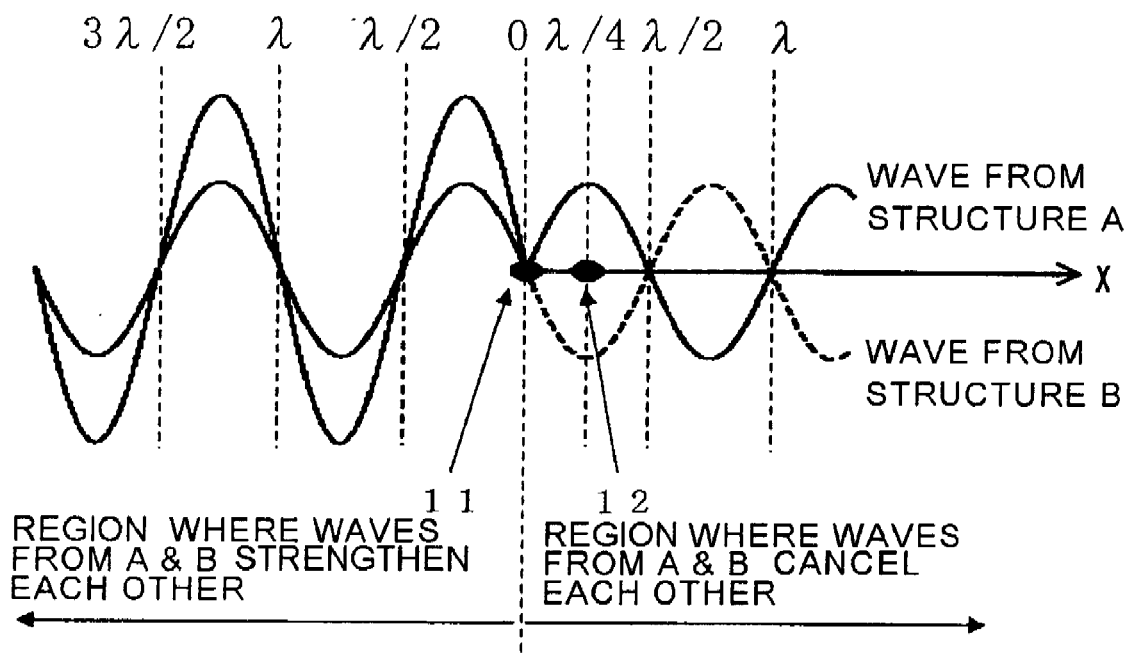

PHOTONIC CRYSTAL OPTICAL CIRCUIT AND METHOD FOR CONTROLLING THE SAME

FIELD OF THE INVENTION

This invention relates to a structure for controlling the spatial distribution (directivity) of light in connection with localization or propagation of an electromagnetic field (light) and emission or reception of light. More particularly, it relates to a structure of an optical device, adapted for carrying out functional operations by controlling the localization or propagation of the electromagnetic field and emission or reception of light in photonic crystals.

BACKGROUND OF THE INVENTION

Recently, photonic crystals have been attracting notice because these crystals exhibit peculiar spatial distribution or are capable of confining the light in a minute area of the order of submicrons. The photonic crystals are formed by periodically arraying two or more mediums having different dielectric functions. Depending on the spatial dimensions of the periodic arrangement, the photonic crystals exhibiting the periodicity only in a one-dimensional direction are termed one-dimensional photonic crystals, while those exhibiting the periodicity in a two-dimensional direction as well and those exhibiting the periodicity in a three-dimensional direction as well are termed two-dimensional photonic crystals and three-dimensional crystals, respectively. The one-dimensional photonic crystals, formed in many cases by a dielectric multi-layer film, exhibit 'periodicity' characteristic of the photonic crystals. Thus, one-dimensional, two-dimensional and three-dimensional photonic crystals, exhibiting the periodic structure, are herein collectively termed photonic crystals.

By introducing line defects into those photonic crystals having a wavelength range devoid of the state of light propagation (photonic band gap), it is possible to produce a waveguide mode in the line defects by light confinement by the photonic band gap, instead of by total light reflection by the differential in the refractive index as in the usual light waveguide (for example, see Non-Patent Document 1).

[Non-Patent Document 1]
J. D. Joannopoulos et al., "Photonic Crystals" (Princeton University Press, 1995)

With the use of this technique, minute light waveguides, enabling sharp bends, may be achieved, and hence the photonic crystals are expected to be used e.g. in a minute optical circuit for communications (for example, see Non-Patent Documents 2 and 3).

[Non-Patent Document 2]
A. Mekis et al., Phys. Rev. B58, 4809 (1998)

[Non-Patent Document 3]
A. Mekis et al., Phys. Rev. Lett. 77, 3787 (1996)

A light waveguide by line defects, introduced into a slab type two-dimensional photonic crystal structure, a Y-branch or a directivity coupler, employing the light waveguide, has been proposed or proven (for example, see Non-Patent Documents 4 to 7).

[Non-Patent Document 4]
S. Y. Lyn et al., Science 282, 274 (1998)

[Non-Patent Document 5]
S. Y. Lyn et al., Opt. Lett. 27, 1400 (2002)

[Non-Patent Document 6]
M. Tokushima et al., Appl. Phys. Lett., 76, 952 (2000)

[Non-Patent Document 7]
H. Yamada et al., submitted to SPIE

For application of the photonic crystals to laser, there is known a single-function optical device of a photonic crystal structure having one of the functions of emission (generation), amplification and modulation of light of a specified wavelength (for example, see Patent Document 1). The light radiated from a light emitting member may be waveguided by the above line defects to be taken to outside the photonic crystal.

There is known an optical device, operating as an optical switch, for controlling the on/off of light incident on the photonic crystal area, by controlling the voltage applied across first and second electrodes, formed to the same pattern on both surfaces of the photonic crystal area (Patent Document 2).

There is also known an apparatus in which the refractive index of photonic crystals is changed by increasing or decreasing the number of electrons in a non-equilibrium state of the photonic crystals, and in which 32 or more lattices are provided along the proceeding direction of the signaling light to enable a sufficiently large change in the light transmittivity, that is, extinction ratio, to be achieved (for example, see Patent Document 3).

There is also known a photonic crystal waveguide in which the separation between the waveguide and a point defect is suitably set to control the proportion of light and electromagnetic waves captured and output (for example, see Patent Document 4).

There is further known an optical device, as a novel device capable of controlling the band structure of the photonic crystals freely, significantly and dynamically, in which the device comprises a structure including at least second and third optical mediums, periodically arranged in a first optical medium at a spacing of the order of a wavelength of the incident light, and in which the conditions of the external fields, applied to the above structure, are changed to vary the refractive index relationships of the first to third optical mediums to render variable the periodicity of spatial distribution of the refractive indices in the above structure (for example, see Patent Document 5).

[Patent Document 1]
JP Patent Kokai Publication No. JP-A-11-330619 (pages 4 and 5 and FIGS. 1, 4, 8 and 9)

[Patent Document 2]
JP Patent Kokai Publication No. JP-P2002-131715A (pages 5 to 7 and FIGS. 1 and 9)

[Patent Document 3]
JP Patent Kokai Publication No. JP-P2002-062554A (page 4 and FIGS. 1 and 9)

[Patent Document 4]
JP Patent Kokai Publication No. JP-P2001-272555A (page 4 and FIG. 1)

[Patent Document 5]
JP Patent Kokai Publication No. JP-P2001-091912A (page 4 and FIG. 1)

SUMMARY OF THE DISCLOSURE

Up to now, a large variety of functions have been proposed as the functions necessary for realization of optical circuits by photonic crystals. However, if the functions of light emitting or light receiving devices are built into an optical circuit, these devices, simply arranged in the optical circuit, are unable to cause the function of the optical circuit to be displayed.

If the functions as the optical circuit are to be exploited, it is necessary to control the direction of radiation of light from a light emitting member for coupling the light to the waveguide in the optical circuit.

As for the light receiving device, the direction of light reception by the light receiving device needs to be controlled in order to increase the light receiving efficiency of the device.

In addition, a part which performs functional operations for controlling the directivity of light localized and propagated for carrying out the functional operation needs to be provided in a waveguiding member of the optical circuit.

Accordingly it is a principal object of the present invention to introduce a new concept and new functions into an optical device or an optical circuit exploiting photonic crystals of the related art and to provide a fundamental principle and a structure in which directivity of localization and propagation of an electromagnetic field of a spatial region, inclusive of the defects formed in photonic crystals (such as point defects, defects in a waveguide or defects in light emitting or receiving devices), light emission or light reception, is controlled to produce functional operations.

According to one aspect of the present invention which accomplishes the above object, photonic crystals having two or more types of mediums with different dielectric constants periodically arrayed, comprises a structure A having a certain natural resonance frequency fr, and another structure B arranged in direct proximity of the structure A and which is adapted for oscillating with a lead or a lag of $\pi/2$ ($\lambda/4$) of the phase of the electromagnetic field (light) with respect to the structure A, wherein directivity of at least one out of localization and propagation of the electromagnetic field, light emission and light reception in the spatial region comprising the above structures is controlled to execute the functional operation corresponding to the control performed.

A photonic crystal optical circuit, according to the present invention, includes a structure having a certain natural resonance frequency fr, and another structure, which has a natural resonance frequency slightly different from the natural resonance frequency of the first-stated structure (fr±Δf), and which is arranged in the vicinity of the one structure, in which the directivity of the localization or propagation of an electromagnetic field, light emission or light reception is controlled to execute the functional operations.

The photonic crystal optical circuit according to the present invention is such a photonic crystal optical circuit, adapted for carrying out functional operations by controlling the directivity of localization or propagation of an electromagnetic field, light emission or light reception, in which a structure having a certain natural resonance frequency fr, and another structure having a natural resonance frequency slightly different from the natural resonance frequency of the first-stated structure (fr±Δf), are arranged at a distance from each other equal to approximately $\lambda/4 + n\lambda/2$, where $\lambda$ is a wavelength and n is an integer.

The photonic crystal optical circuit according to the present invention is such a photonic crystal optical circuit, adapted for carrying out functional operations by controlling the directivity of localization or propagation of the electromagnetic field, light emission or light reception, in which it is the directivity of the radiation pattern of the radiation from the light emitting member that is controlled.

The photonic crystal optical circuit according to the present invention is such a photonic crystal optical circuit, adapted for carrying out functional operations by controlling the directivity of localization or propagation of the electromagnetic field, light emission or light reception, in which it is the directivity of the light receiving pattern of the radiation from the light receiving member that is controlled.

The photonic crystal optical circuit according to the present invention is such a photonic crystal optical circuit, adapted for carrying out functional operations by controlling the directivity of localization or propagation of the electromagnetic field, light emission or light reception, in which the coupling of the electromagnetic field from one line defect waveguide to another line defect waveguide is controlled.

The photonic crystal optical circuit according to the present invention is such a photonic crystal optical circuit, adapted for carrying out functional operations by controlling the directivity of localization or propagation of the electromagnetic field, light emission or light reception, in which a switching operation may be carried out by varying the dielectric function of a structure having a certain natural resonance frequency fr and and/or another structure arranged in the vicinity of the first-stated structure and having a natural resonance frequency (fr±Δf).

The present invention introduces a wholly new concept (principle) and functions into a conventional optical device or an optical circuit including photonic crystals. That is, the present invention suitably arranges, in the vicinity of a certain structure in photonic crystals, another structure, the natural resonance frequency of which slightly differs from that of the first-stated structure, whereby it is possible to control the directivity of localization or propagation of an electromagnetic field, light emission or light reception of a spatial region including the structures formed in the photonic crystals, such as point defects or defects in the waveguide, light emitting member or in the light receiving member, in order to permit functional operations to be achieved.

BRIEF DESCRIPTION OF THE DRAWINGS

FIG. 1 is a diagram for illustrating the fundamental principle of the present invention.

PREFERRED EMBODIMENTS OF THE INVENTION

Figure 2A:
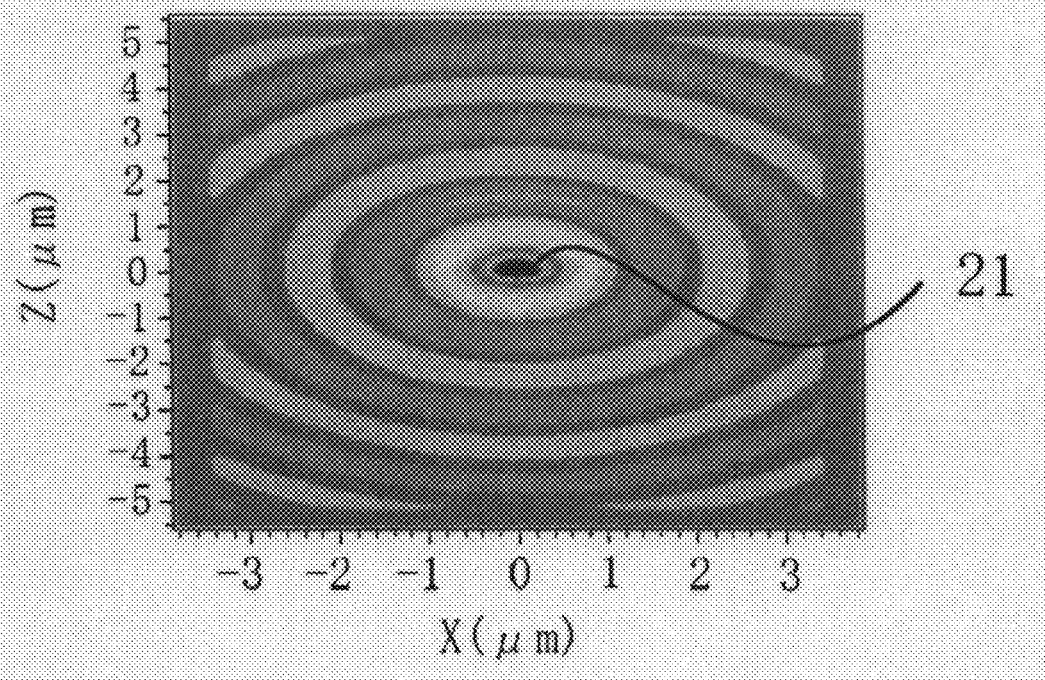
FIG. 2A is a diagram for illustrating the present invention and showing a pattern of radiation of an electric field in case a columnar-shaped light emitting member is placed in vacuum.
Figure 2B:
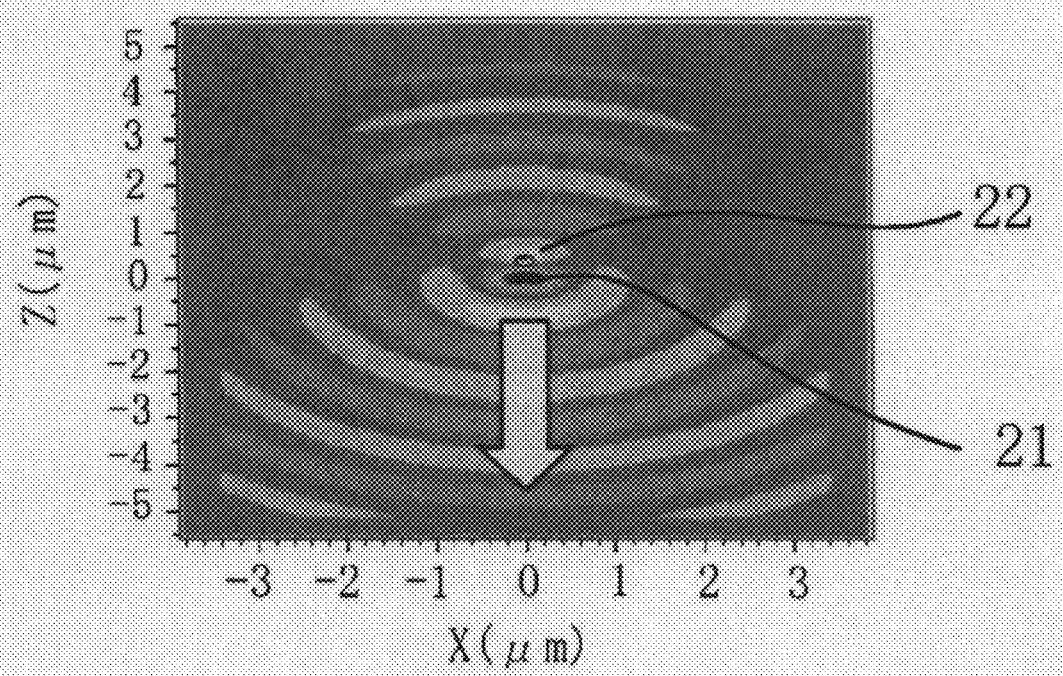
FIG. 2B is a diagram for illustrating the present invention and showing a pattern of radiation of an electric field in case a columnar-shaped light emitting member and a reflecting member, having a natural resonance frequency slightly lower than the columnar-shaped light emitting member, are placed in vacuum.

For more detailed explanation of the present invention, reference is made to the accompanying drawings. First, the principle of the present invention is explained, and preferred embodiments thereof will then be explained. With the above-described conventional technique of the configuration in which the light waveguiding direction in the photonic crystals is determined by a line defect waveguide, there is imposed a limitation on the direction of possible introduction of a line defect waveguide, in dependence upon the structure of the unit cells forming the photonic crystals and upon the periodicity thereof. For example, with a two-dimensional square lattice, the line defect waveguide can be introduced only in four directions, mutually forming an angle of 90°, and with a triangular lattice, the line defect waveguide can be introduced only in six directions, mutually forming an angle of 60°.

The present invention renders it possible to provide a function of coupling the light, localized in such line defect waveguide, to another line defect waveguide, and to increase the degree of freedom of the waveguiding direction of light in the photonic crystals. That is, the present invention includes a structure having a certain natural resonance frequency fr, and arranges another structure, having a natural resonance frequency only slightly different from the first-stated structure (fr±Δf), in the vicinity of the first-stated structure, whereby the directivity of localization or propagation of an electromagnetic field (light), or emission and reception of light, in a spatial region comprising the aforementioned structures, may be controlled to permit execution of functional operations.

Moreover, since the line defect waveguide mode usually exploits the mode in the photonic band gap, such line defect does not operate as a waveguide in the transmission wavelength band in the photonic crystals. Even in such transmission wavelength band, there is obtained, from the light emitting area in the photonic crystals, a radiation pattern reflecting the symmetry of the structure of the light emitting area with respect to the photonic crystals. The present inventors have found that the pattern of light emission and radiation may be controlled by introducing a structure, such as point defect, having a resonance frequency extremely close to the wavelength of the emitted light into close vicinity of the light emitting area.

By exploiting this principle, it is possible to control the pattern of light emission and radiation of the light emitting device embedded in the photonic crystals. For example, a light emitting device may be realized which is able to radiate light strongly only in one direction. For example, a light emitting device, capable of radiating light strongly only in one direction, may be realized, or alternatively, the light receiving direction of the light receiving device, provided in the photonic crystals, may be controlled. Hence, it becomes possible to add a totally novel function as an optical circuit.

The principle of the present invention is valid not only for the light propagation area in the photonic crystals but also in a wavelength range in the photonic band gap, and may further be used in a general optical circuit comprising the combination of homogeneous mediums.

The fundamental principle of the photonic crystal optical circuit of the present invention will now be explained with reference to FIG. 1.

At a location separated by λ/4 from a structure A11 (light emitting member A) having a given natural resonance frequency fr, there is arranged another structure B12 (light emitting member B). In FIG. 1, the wave of light from the light emitting member A is represented by a solid line and that from the light emitting member A is represented by a broken line. Since the light emitting member A emits light with a phase delay of π/2 with respect to that from the light emitting member B, the light from the light emitting member A interferes with that from the light emitting member B, so that there are generated an area where the waves from the light emitting members A and B strengthen each other and an area where the waves cancel each other. By this principle, it becomes possible to control the directivity of light radiated from a given light emitting member.

For realization of the light emitting member B that emits light with a phase lead of π/2 or with a phase lag of π/2, there is a method in which such light waves may be transmitted to both the light emitting members A and B. However, another method, in which the light wave may be sent to only the light emitting member A and the light emitting member B may be externally excited into oscillations responsive to the light wave emitted from the light emitting member A, may be used. If, in this case, the number of natural oscillations of the light emitting member B is slightly lower or higher than that of the light emitting member A, the light emitted by the light emitting member B start oscillation with a phase lag or with a phase lead with respect to the light emitting member A, respectively.

The concrete results of calculations will now be described, by way of an Example, with reference to FIGS. 2A, 2B, 3A and 3C. If, at a location separated from approximately λ/4 (where λ being a wavelength) from the center of the light emitting member 21, emitting light with a natural resonance frequency fr, here a column (see FIG. 2A), a reflecting member 22, here a column, comprising a structure having a natural resonance frequency only slightly lower than the light emitting member 21 (frequency of fr−Δf), the pattern of radiation of the light emitting member 21 becomes stronger in a direction opposite to that of the light emitting member 22, as may be seen from the results of analysis of the electromagnetic field (see FIG. 2B).

Figure 3A:
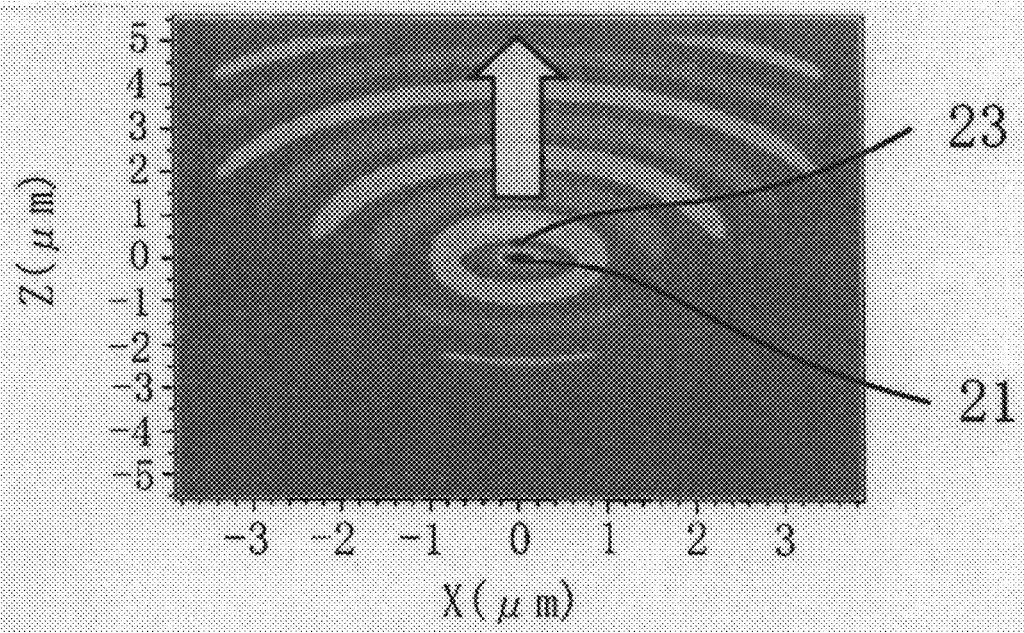
FIG. 3A is a diagram for illustrating the present invention and showing a pattern of radiation of an electric field in case a columnar-shaped light emitting member and a light reflecting member, having a natural resonance frequency slightly higher than the columnar-shaped light emitting member, are placed in vacuum.

On the other hand, if, at a location separated from approximately λ/4 (λ being a wavelength) from the center of the light emitting member 21, a waveguiding member 23, here a column, comprising a structure having a natural resonance frequency only slightly higher than that of the light emitting member 21 (frequency of fr+Δf), the pattern of radiation of the light emitting member 21 becomes stronger in the same direction as that of the waveguiding member 23, as may be seen from the results of analysis of the electromagnetic field (see FIG. 3A).

The structure with the natural resonance frequency slightly higher or lower than that of the light emitting member 21 commences to emit light, on reception of light from the light emitting member 21, by externally triggered oscillation and, at this time, emits light with a phase lead or lag of π/2 as compared to the light emitting member 21, respectively. Thus, light is radiated strongly only in a specified direction, as indicated in the previous embodiment.

Figure 3B:
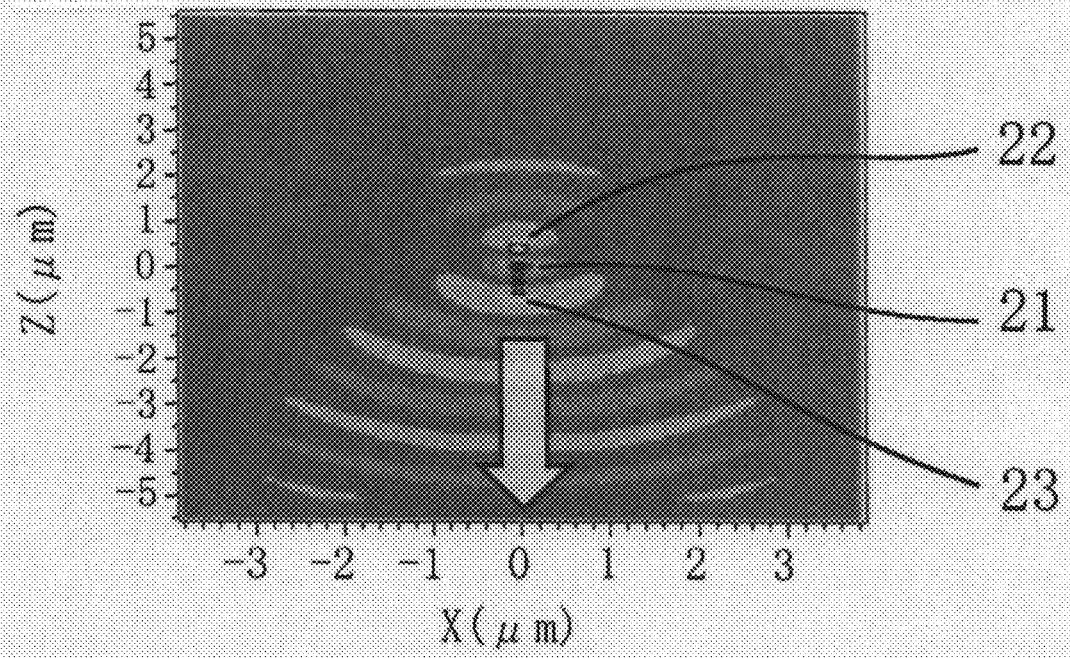
FIG. 3B is a diagram for illustrating the present invention and showing a pattern of radiation of an electric field in case a columnar-shaped light emitting member, a light reflecting member, having a natural resonance frequency slightly lower than the columnar-shaped light emitting member, and a waveguiding member, having a natural resonance frequency slightly higher than the columnar-shaped light emitting member, are placed in vacuum.

Thus, by suitably arranging the structures of the reflecting member 22 and the waveguiding member 23, in the vicinity of the area of the light emitting member 21, the radiation pattern of the light emitting member, radiating light only in a sole direction, as shown in FIG. 3B, may be realized, thus allowing the control of the light radiating pattern of the light emitting member.

The above-described principle holds not only for the light emitting member but also for the light receiving member, thus allowing control of the light receiving pattern of the light receiving member.

The principle is not limited to the above mentioned columnar structure and also holds without dependency on the shape or the material type of the light emitting member, light receiving member, light reflecting member, or the waveguiding member.

Figure 4A:
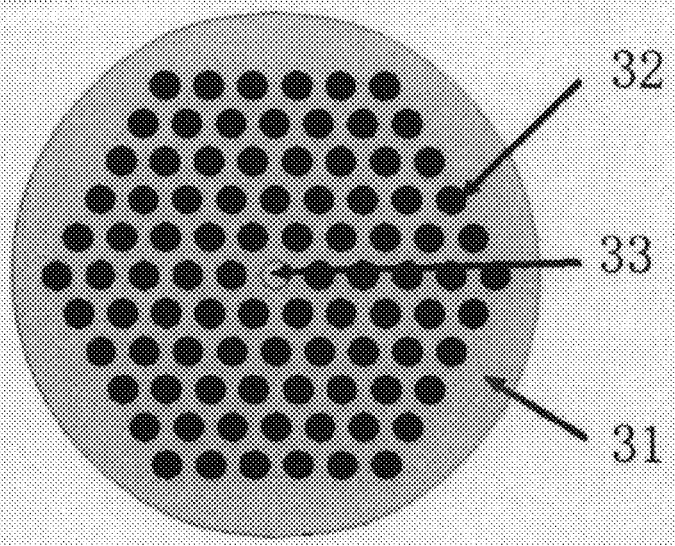
FIG. 4A is a diagram for illustrating the present invention and showing a structure in which a single-point defect is placed at the center of Si photonic crystals having triangular lattice structures of air holes.

FIGS. 4A, 4B, 5A and 5B show an illustrative structure of an embodiment of the present invention and show an example of implementing the aforementioned structure by point defects in the photonic crystals. In FIG. 4A, the photonic crystals are two-dimensional photonic crystals comprising a substrate 31 of a refractive index of 3.37, and a number of air holes 32, arranged in triangular patterns in the substrate. There is arranged a point defect 33 as a light emitting member at the center of the substrate.

Figure 4B:
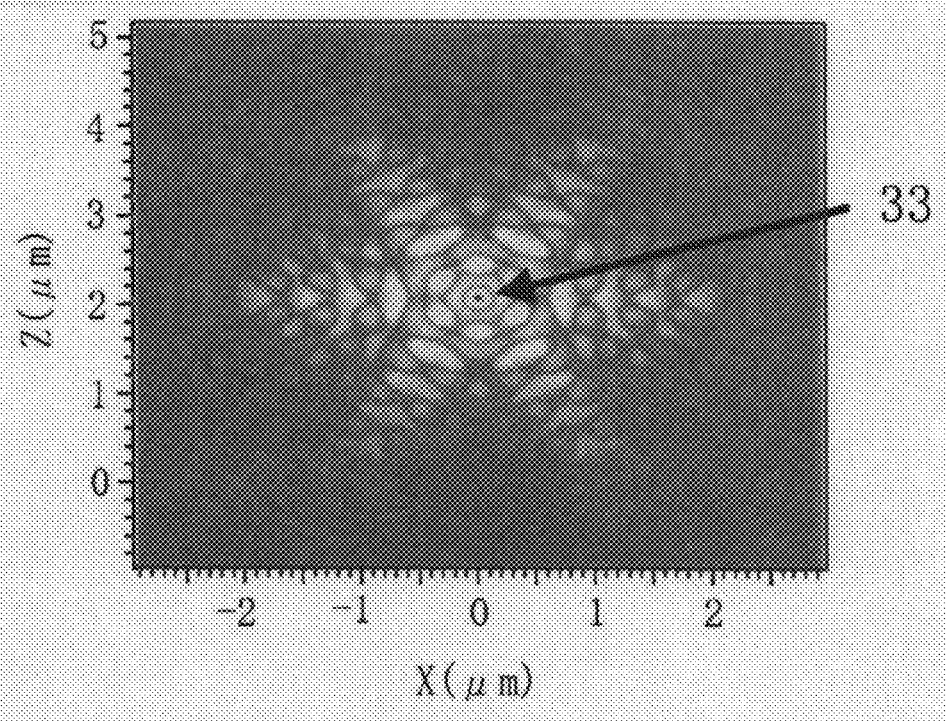
FIG. 4B is a diagram for illustrating the present invention and showing a pattern of radiation of an electric field in case a single point defect (light emitting member) is placed at the center of Si photonic crystals having triangular lattice structures of air holes.

The radiation from the light emitting member (point defect) 33, forms a radiation pattern which reflects density of the states and symmetry of the electromagnetic field in the photonic crystals (see FIG. 4B).

Figure 5A:
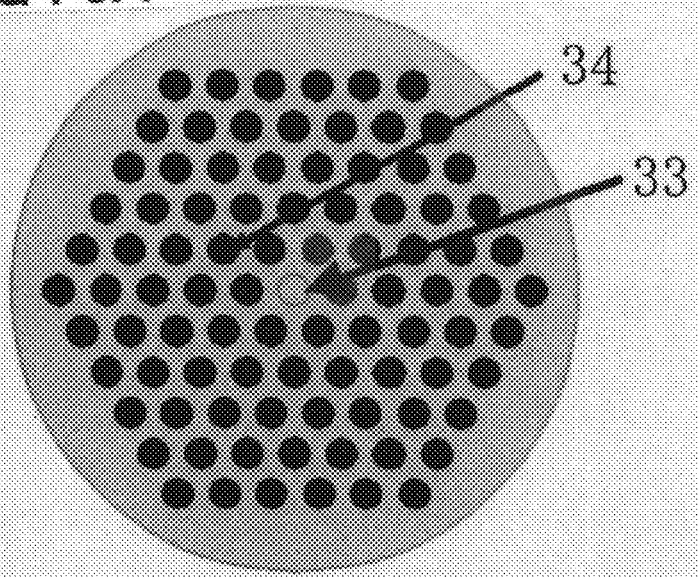
FIG. 5A is a diagram for illustrating the present invention and showing a structure in which a waveguide by a point defect is placed in the vicinity of a light emitting member and FIG. 5B is a diagram for illustrating the present invention and showing a pattern of radiation of light in case a waveguide by a point defect is placed in the vicinity of a light emitting member.
Figure 5B:
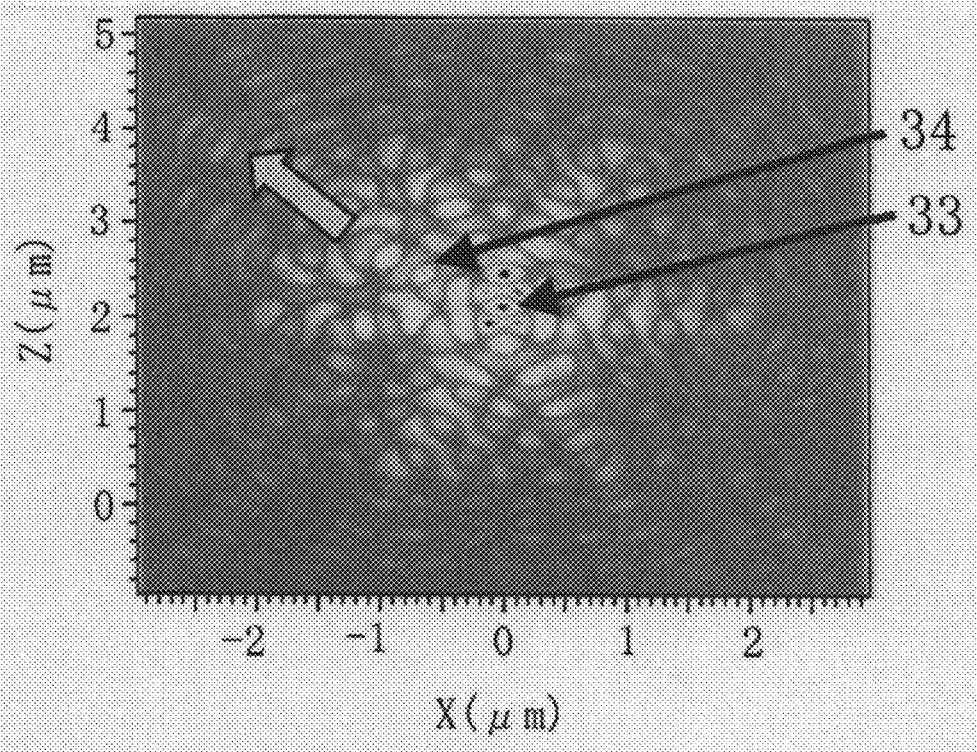

Referring to FIG. 5A, there is arranged, in close proximity to the point defect 33 having a natural resonance frequency, in the photonic crystals, a waveguiding member 34, which is composed of a structure having a resonance frequency close to the natural resonance frequency fr, and which may also be another point defect, is arranged in the photonic crystals. With such configuration, it is possible to control the radiation pattern of the light emitting member (point defect) 33, as shown in FIG. 5B. If, as may be seen from FIG. 5B, a waveguide (point defect) 34, having a resonant frequency only slightly larger than the point defect as the light emitting member 33, is placed in the vicinity of the point defect, as the light emitting member 33, the radiation pattern of the emitted light is offset towards the waveguiding member 34.

As may be seen from above, if, another defect, for example, having a natural resonance frequency slightly different from the natural resonance frequency of the light emitting member in the photonic crystals, is arranged in the vicinity of a light emitting member in the photonic crystals, it is possible to control the radiation pattern of the light emitting member.

The above-described embodiment is directed to two-dimensional photonic crystals comprising a number of air holes making up a triangular lattice structure. However, the principle of the present invention similarly applies for a one-dimensional, two-dimensional or a three-dimensional photonic crystal, without dependency upon the values of the refractive index (or the dielectric function) of the substrate, or the shape or symmetry of the lattice.

Figure 6:
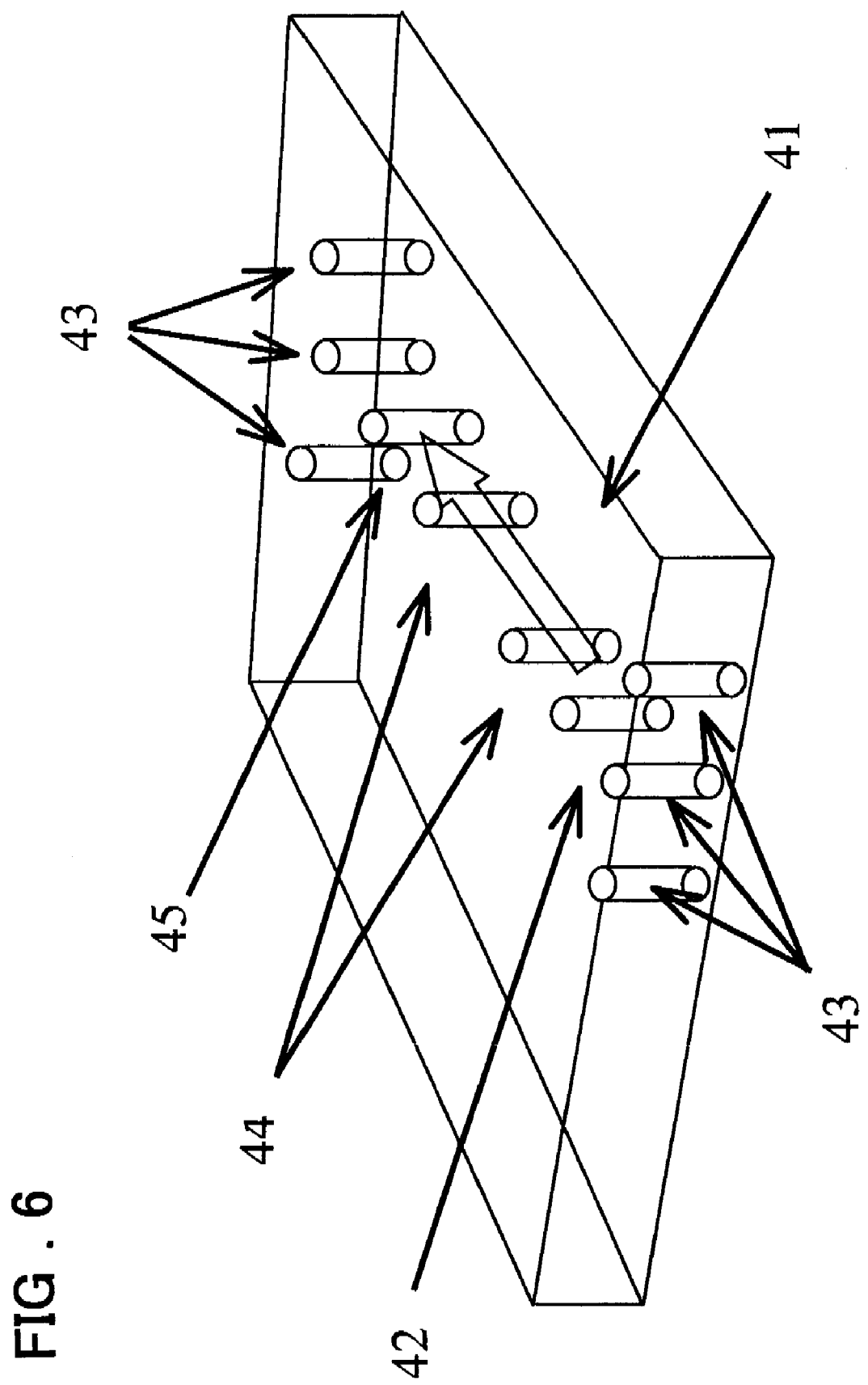
FIG. 6 is a diagram for illustrating the present invention and specifically illustrates the concept of exploiting the structure of the present invention in a planar optical circuit.

FIG. 6 shows the structure of another embodiment of the present invention. In this embodiment, the above-described principles of the present invention are combined for realization of the functions of light emission and light reception in a space or region of free propagation of light 41 in a photonic crystal optical circuit or in an optical circuit comprising the combination of homogeneous dielectric materials.

Referring to FIG. 6, a plural number of reflecting members 43 are arranged for extending along opposing one and other lateral sides of the space for free propagation of light 41 (vacuum or the photonic crystals), a light emitting member 42 is arranged in the vicinity of the reflecting members 43 on one lateral side, a light receiving member 45 is arranged in the vicinity of the reflecting members 43 on the other lateral side, and a plural number of waveguiding members 44 are arrayed in a line between the light emitting member 42 and the light receiving member 45.

The light radiated from the light emitting member 42 (resonance frequency fr) has its directivity controlled by the reflecting members 43, lying in the vicinity thereof, each having the resonance frequency (fr−Δf), and by the waveguiding members 44, lying in the vicinity thereof, each having the resonance frequency (fr+Δf) so that the light is radiated strongly along the arraying direction of the waveguiding members 44, that is, towards the light receiving member 45, as indicated by an arrow of FIG. 6.

In the vicinity of the light receiving member 45, there are arranged the light reflecting members 43 and the waveguiding member 44, so that the light receiving member 45 is able to receive light more efficaciously.

In FIG. 6, another waveguide may be coupled to the light emitting member 42 and the light receiving member 45 for adding the function of waveguiding the light in a further different direction. The refractive index of the waveguiding member 44, arranged in the vicinity of the light emitting member 42 and the light receiving member 45, may also be changed from outside for adding the function of switching the light waveguiding function or for enabling the switching operation.

Figure 7:
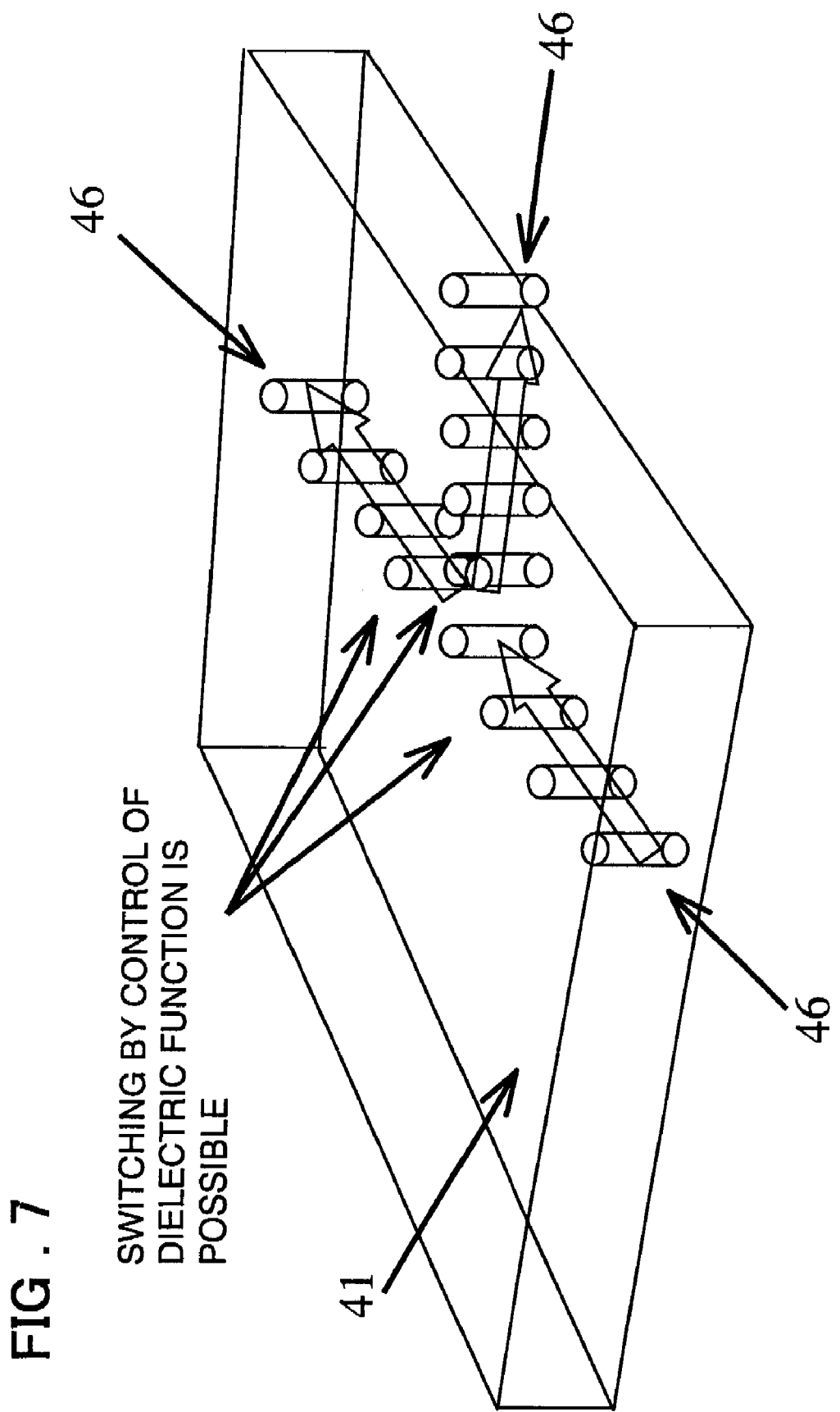
FIG. 7 is a diagram for illustrating the present invention and specifically illustrating the concept of exploiting the structure of the present invention in a planar optical circuit (a branching filter or a switch).

FIG. 7 shows the configuration of a further embodiment of the present invention having a function of waveguiding the light in a direction distinct from one waveguiding direction. Referring to FIG. 7, a light waveguide 46, made up by plural waveguiding members, is provided for extending from one lateral side to the opposite lateral side, and another light waveguide 46 is provided for extending from a mid portion of the one light waveguide 46 at a preset angle with respect to the direction of the one light waveguide 46. The light branching direction may be switched in a controlled manner by controlling the dielectric function of the structure which forms the intersecting portion of the light waveguides.

Figure 8:
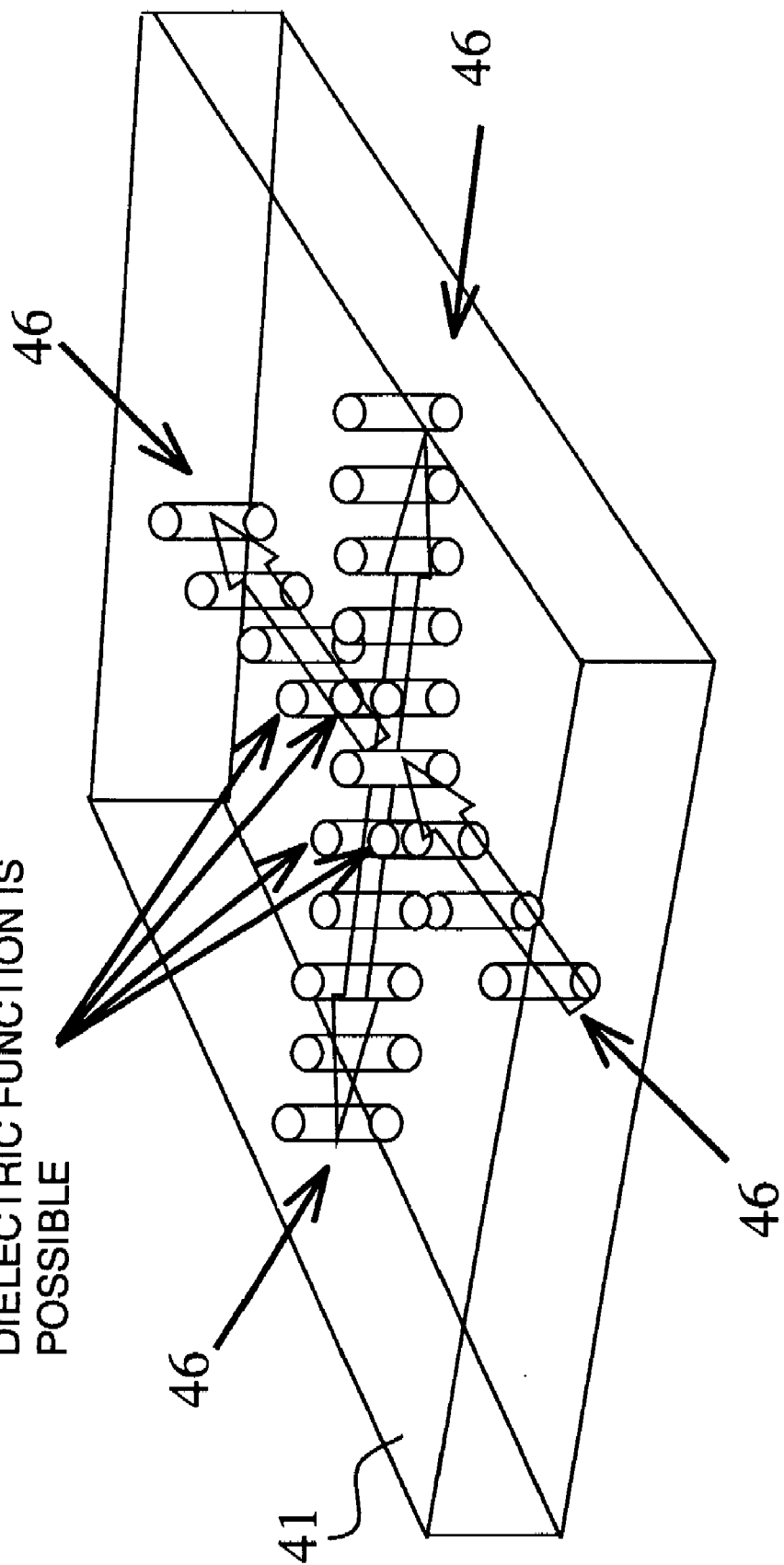
FIG. 8 is a diagram for illustrating the present invention and specifically illustrating the concept of exploiting the structure of the present invention (a branching filter or a switch) in a planar optical circuit in case of a multi-channel.

FIG. 8 shows the structure of a further embodiment of the present invention. Referring to FIG. 8, one light waveguide 46, made up by plural waveguiding members, is provided for extending from one lateral side to the opposite lateral side of a space of free propagation of light 41, and another light waveguide 46 is provided for extending from a mid portion of the one light waveguide 46 at a right angle with respect to the direction of the one light waveguide 46. The waveguiding of light may be switched in a controlled manner by controlling the dielectric function of the structure which forms the intersecting portion of the light waveguides. That is, the light waveguided in the one light waveguide 46 may be branched at the branching point in at least one of three directions, that is, the direction corresponding to the original light proceeding direction, namely a direction along the one light waveguide 46, and the directions along the other light waveguide 46.

Figure 9:
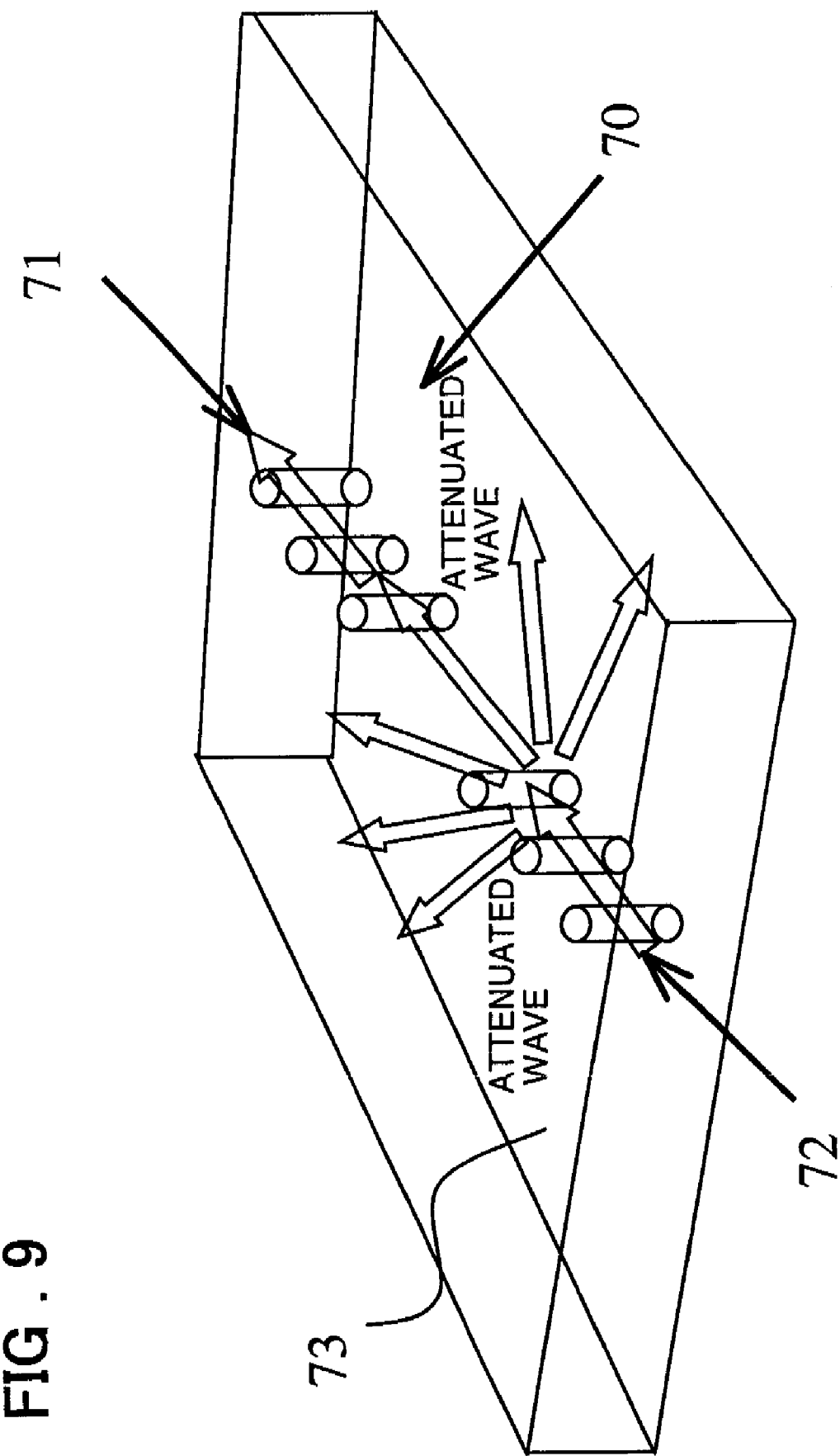
FIG. 9 is a diagram for illustrating the present invention and specifically illustrating the concept of exploiting the structure of the present invention in a planar optical circuit (with a wavelength in a photonic band gap).

In the above-described second to fourth embodiments, the space for free propagation of light 41 may be replaced by photonic crystals of the wavelength band in which the propagation mode is inhibited by the photonic band gap. If, in this case, there is no structure other than the photonic crystals, in the spatial region of the directivity-controlled light mode, the light is attenuated, as indicated by an attenuated wave 73 of FIG. 9. However, by adding other new different structures, devices or waveguides to the spatial region, it becomes possible to couple different waveguides to one another or to couple a waveguide to different devices. In the case of FIG. 9, the light waveguided along the arraying direction of a light waveguide 72 in photonic crystals 70 proceeds along the arraying direction of the light waveguide 72, while light proceeding in the directions other than the arraying direction of the light waveguide 72 becomes attenuated waves 73.

Although the present invention has so far been described with reference to the above embodiments, the present invention is not limited to these specific embodiments and may, of course, comprise various changes or corrections that may occur to those skilled in the art within the scope of the invention as defined in the claims.

INDUSTRIAL UTILIZABILITY

According to the present invention, described above, the directivity of localization or propagation of the electromagnetic field, light emission or light reception may be controlled to enable desired functions and operations to be realized for use conveniently for a variety of optical devices.

The invention claimed is:

1. An optical circuit apparatus comprising a free propagation region composed of photonic crystals or vacuum, said free propagation region comprising:
   a first structure comprising at least one light emitting member having a first natural resonance frequency; and
   a second structure, arranged in the vicinity of said first structure, comprising at least one reflecting member having a second natural resonance frequency smaller than said first natural resonance frequency, said second structure emitting light by externally triggered oscillation responsive to light from said light emitting member; wherein
   electromagnetic waves of light from said first structure constructively and destructively interfere with electromagnetic waves of light from said second structure, such that a directivity of light emitted from said free propagation region is thereby controlled.

2. An optical circuit apparatus comprising a free propagation region composed of photonic crystals or vacuum, said free propagation region comprising:
   a first structure comprising at least one light emitting member having a first natural resonance frequency; and
   a second structure, arranged in the vicinity of said first structure, comprising at least one waveguiding member having a second resonance frequency larger than said first natural resonance frequency, said second structure emitting light by externally triggered oscillation responsive to light from said first structure; wherein
   electromagnetic waves of light from said first structure constructively and destructively interfere with electromagnetic waves of light from said second structure such that a directivity of light emitted from said free propagation region is thereby controlled.

3. An optical circuit apparatus comprising a free propagation region composed of photonic crystals or vacuum, said free propagation region comprising:
   a first structure comprising at least one light emitting member having a first natural resonance frequency;
   a second structure, arranged in the vicinity of said first structure, comprising at least one reflecting member having a second natural resonance frequency smaller than said first natural resonance frequency, said second structure emitting light by externally triggered oscillation responsive to light from said first structure; and
   a third structure, arranged in the vicinity of said first structure, comprising at least one waveguiding member having a third natural resonance frequency larger than said first natural resonance frequency, said third structure emitting light by externally triggered oscillation responsive to light from said first structure; wherein
   electromagnetic waves of light from said first structure constructively and destructively interfere with electromagnetic waves of light from said second structure and with electromagnetic waves of light from said third structure, such that a directivity of the light radiated from said free propagation region is thereby controlled.

4. The optical circuit apparatus according to claim 2, wherein said free propagation region further comprises,
   a third structure, comprising at least one light receiving member, disposed such that said second structure is disposed between said first structure and said third structure.

5. The optical circuit apparatus according to claim 2, wherein said second structure comprises:
   a first waveguide comprising a plurality of said waveguiding members arranged in a line; and
   a second waveguide comprising a plurality of said waveguiding members arranged in a line branching from said plurality of waveguiding members of said first waveguide at a preset angle;
   wherein the light from said first waveguide is coupled to said second waveguide.

6. The optical circuit apparatus according to claim 1, wherein said first and second structures emit light with a preset phase difference from each other.

7. The optical circuit apparatus according to claim 2, wherein said first and second structures emit light with a preset phase difference from each other.

8. An optical circuit apparatus comprising:
   a light emitting member having a first natural resonance frequency;
   a light waveguide comprising photonic crystals and a plurality of structures arranged in an arranging direction in said photonic crystals, said structures each having a second natural resonance frequency different from said first natural resonance frequency, said structures each emitting light by externally triggered oscillation responsive to light from said light emitting member;
   wherein electromagnetic waves of light from said light emitting member constructively and destructively interferes with electromagnetic waves of light from said light waveguide, such that light proceeds along the arraying direction of said light waveguide without attenuation, and light proceeding in other directions than said arraying direction is attenuated.

9. The optical circuit apparatus according to claim 6, wherein said preset phase difference is $\pi/2$.

10. The optical circuit apparatus according to claim 7, wherein said preset phase difference is $\pi/2$.

* * * * *